July 21, 1959 E. AESCHLIMAN 2,896,200

TELEVISION RECEIVER CABINET CONSTRUCTION

Filed May 19, 1954 13 Sheets-Sheet 1

INVENTOR.
EUGENE AESCHLIMAN.
BY Alden D. Redfield
Charles M. Hogan
ATTORNEYS.

INVENTOR.
EUGENE AESCHLIMAN.
BY Alden D. Redfield
Charles M. Hogan.
ATTORNEYS.

July 21, 1959 E. AESCHLIMAN 2,896,200

TELEVISION RECEIVER CABINET CONSTRUCTION

Filed May 19, 1954 13 Sheets-Sheet 3

INVENTOR.
EUGENE AESCHLIMAN.
BY Alden D. Redfield
Charles M. Hogan.
ATTORNEYS.

INVENTOR.
EUGENE AESCHLIMAN.
BY Alden D. Redfield
Charles M. Hogan.
ATTORNEYS.

TELEVISION RECEIVER CABINET CONSTRUCTION

Filed May 19, 1954 13 Sheets-Sheet 5

INVENTOR.
EUGENE AESCHLIMAN.
BY Alden D. Redfield
Charles M. Hogan.
ATTORNEYS.

TELEVISION RECEIVER CABINET CONSTRUCTION

Filed May 19, 1954 13 Sheets-Sheet 6

INVENTOR.
EUGENE AESCHLIMAN.
BY Alden D. Redfield
Charles M. Hogan.
ATTORNEYS.

July 21, 1959 E. AESCHLIMAN 2,896,200

TELEVISION RECEIVER CABINET CONSTRUCTION

Filed May 19, 1954 13 Sheets-Sheet 7

INVENTOR.
EUGENE AESCHLIMAN.
BY Alden D. Redfield
Charles M. Hogan.
ATTORNEYS.

July 21, 1959 E. AESCHLIMAN 2,896,200

TELEVISION RECEIVER CABINET CONSTRUCTION

Filed May 19, 1954 13 Sheets-Sheet 8

INVENTOR.
EUGENE AESCHLIMAN.
BY Alden D. Redfield
Charles M. Hogan.
ATTORNEYS.

TELEVISION RECEIVER CABINET CONSTRUCTION

Filed May 19, 1954 13 Sheets-Sheet 9

INVENTOR.
EUGENE AESCHLIMAN.
BY Alden D. Redfield
Charles M. Hogan.
ATTORNEYS.

INVENTOR.
EUGENE AESCHLIMAN.
BY Alden D. Redfield
Charles M. Hogan
ATTORNEYS.

July 21, 1959 E. AESCHLIMAN 2,896,200

TELEVISION RECEIVER CABINET CONSTRUCTION

Filed May 19, 1954 13 Sheets-Sheet 11

INVENTOR.
EUGENE AESCHLIMAN.
BY Alden D. Redfield
Charles M. Hogan.
ATTORNEYS.

July 21, 1959 E. AESCHLIMAN 2,896,200

TELEVISION RECEIVER CABINET CONSTRUCTION

Filed May 19, 1954 13 Sheets-Sheet 12

INVENTOR.
EUGENE AESCHLIMAN.
BY Alden D. Redfield
Charles M. Hogan.
ATTORNEYS.

July 21, 1959 E. AESCHLIMAN 2,896,200

TELEVISION RECEIVER CABINET CONSTRUCTION

Filed May 19, 1954 13 Sheets-Sheet 13

INVENTOR.
EUGENE AESCHLIMAN.
BY Alden D. Redfield
Charles M. Hogan.
ATTORNEYS.

United States Patent Office 2,896,200

Patented July 21, 1959

2,896,200

TELEVISION RECEIVER CABINET CONSTRUCTION

Eugene Aeschliman, Cincinnati, Ohio, assignor to Avco Manufacturing Corporation, Cincinnati, Ohio, a corporation of Delaware Application May 19, 1954, Serial No. 430,876

4 Claims. (Cl. 340—367)

The present invention relates generally to the mechanical construction of television receivers, and specifically to a novel cabinet construction particularly adapted for use with a vertically oriented chassis, a cathode ray picture tube, and mounting means for the chassis and tube.

Such an arrangement of chassis and picture tube is shown in the copending patent application of William H. Myers entitled "Television Receiver Construction," filed contemporaneously herewith and assigned to the same assignee as the present application and invention.

The prior art television receiver cabinet which has heretofore been universally accepted in the industry is built around a horizontal plane chassis. This prior art construction suffers from the following major disadvantages: (1) Excessive cabinet weight and size, the projection of the chassis below the picture tube being such as to require a cabinet having a volume substantially equal to the volume of the chassis plus the volume of an imaginary rectangualr solid having approximately the length, with and breadth of the picture tube; (2) difficulty in removing the chassis and picture tube from the cabinet; and (3) lack of ready accessibility of the components for service or replacement.

A major object of the present invention is to provide a simple, compact television receiver cabinet which is free from the above-mentioned and other disadvantages and limitations of prior art television receivers.

A further important object of the invention is to provide—in a television receiver of the type comprising a vertical plane chassis having an aperture formed therein and a picture tube disposed with its neck projecting through said aperture—the improvement which comprises a cabinet having a removable base panel and means for mounting the chassis and the picture tube on said panel.

Stated in the alternative, it is an object of the invention to provide, in a television receiver of the type mentioned, a readily removable bonnet type cabinet.

The scope of the invention is a defined in the appended claims. For a better understanding of the invention, together with other and further objects, advantages, and capabilities thereof, reference is made to the accompanying drawings, in which:

*Description of drawings*

Fig. 2 is a rear perspective view of a television receiver in accordance with the invention, with the cabinet removed, the view being taken at a point upwardly, rearwardly, and laterally of the receiver;

Figs. 12, 13, and 14 are the parts (interconnected as indicated by the letters A, B, C, etc.) of circuitry suitable for use with a television receiver cabinet construction in accordance with my invention.

*Cabinet*

Figure 1:
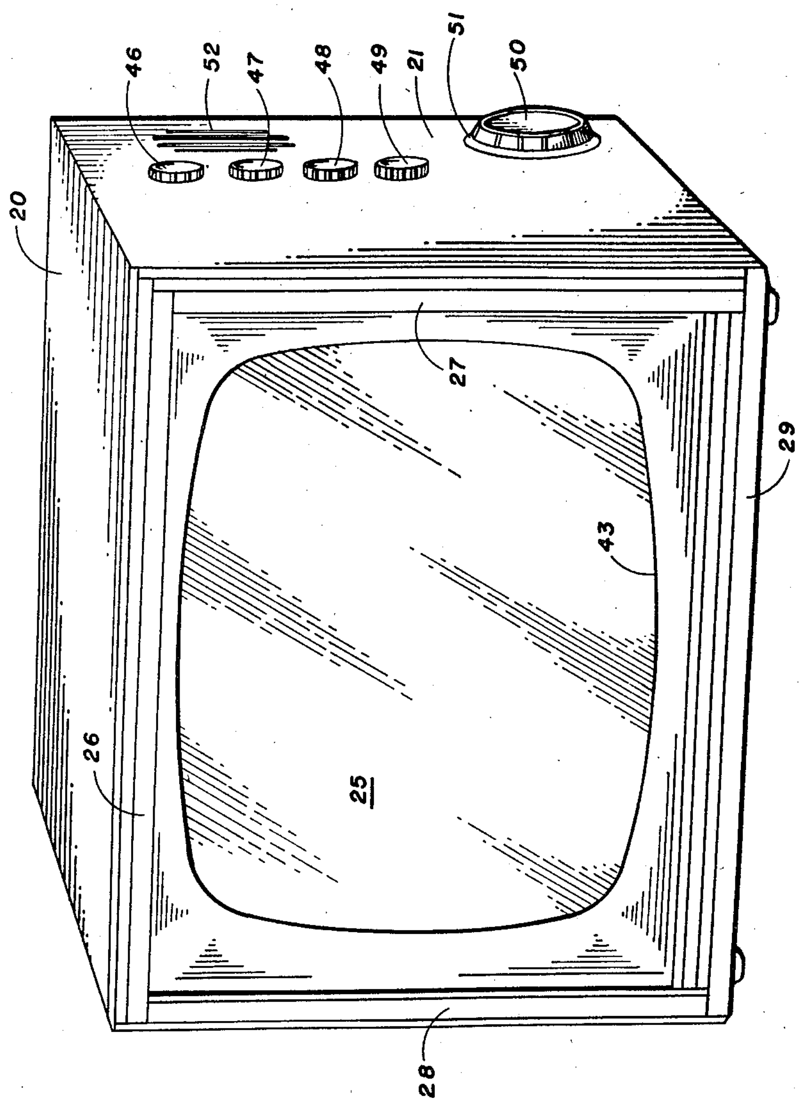
Fig. 1 is a perspective view showing the front, top, and right side of a television receiver cabinet in accordance with the invention.
Figure 3:
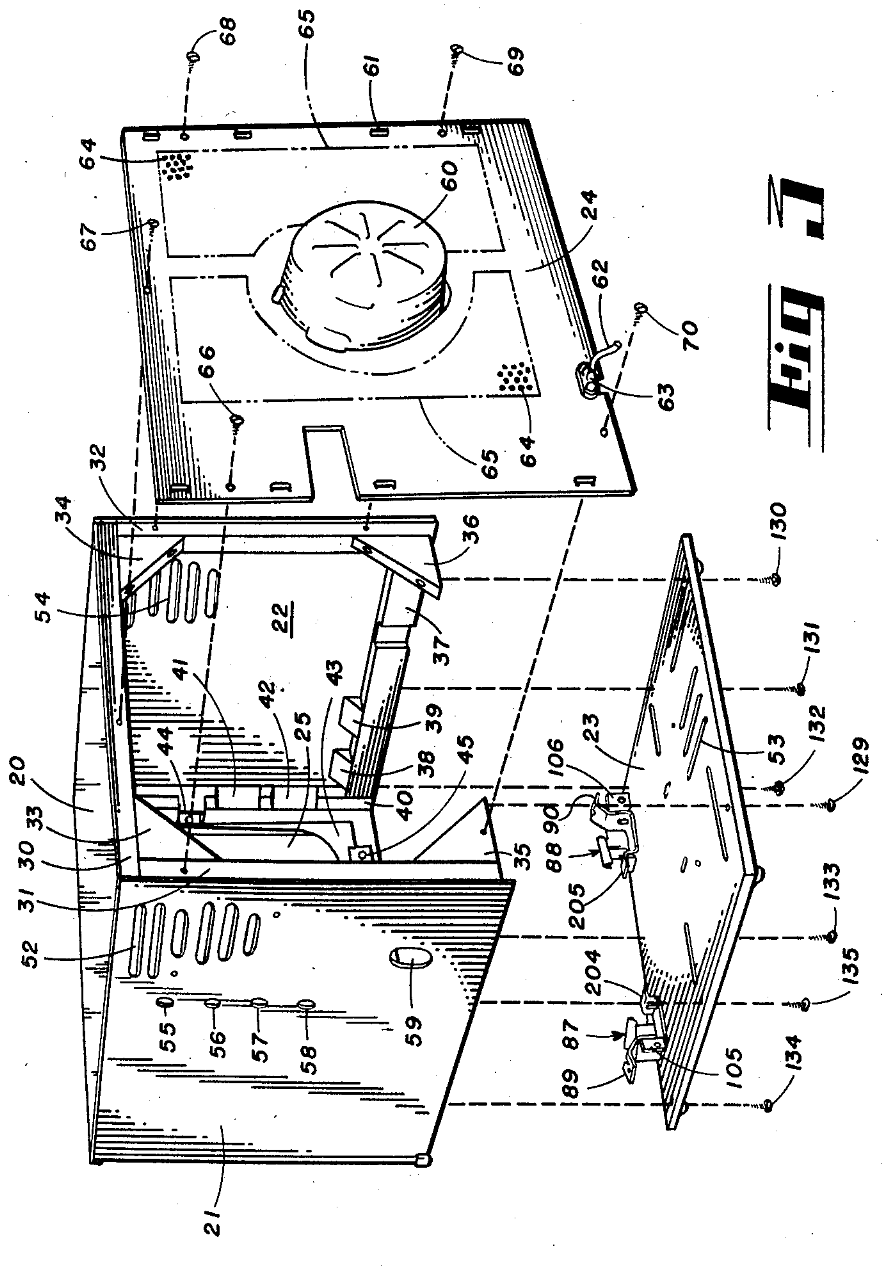
Fig. 3 is a rear perspective view showing the principal components of the cabinet in the positions which they assume as assembly is approached, the chassis being removed for purposes of clarity in showing cabinet details.
Figure 4:
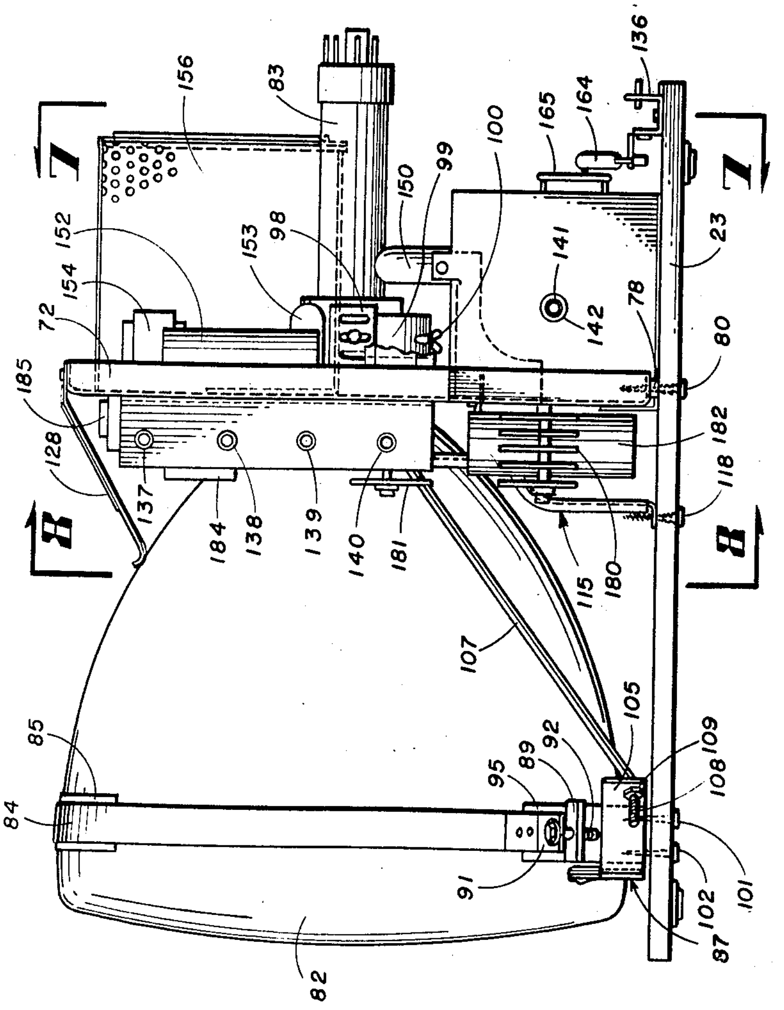
Figs. 4, 5, and 6 are, respectively, right side elevational, left side elevational, and top perspective views showing my improved television receiver construction, the cabinet being removed.
Figure 5:
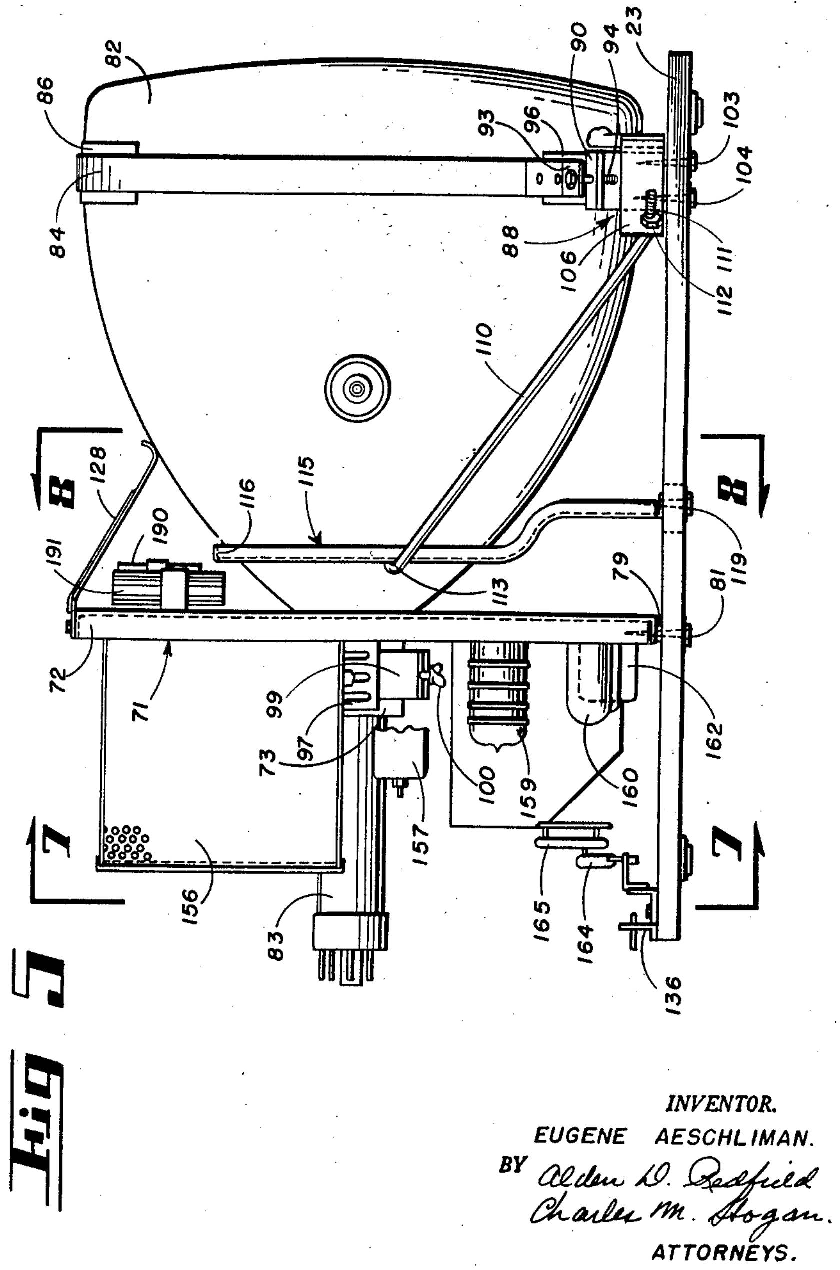
Figure 11:
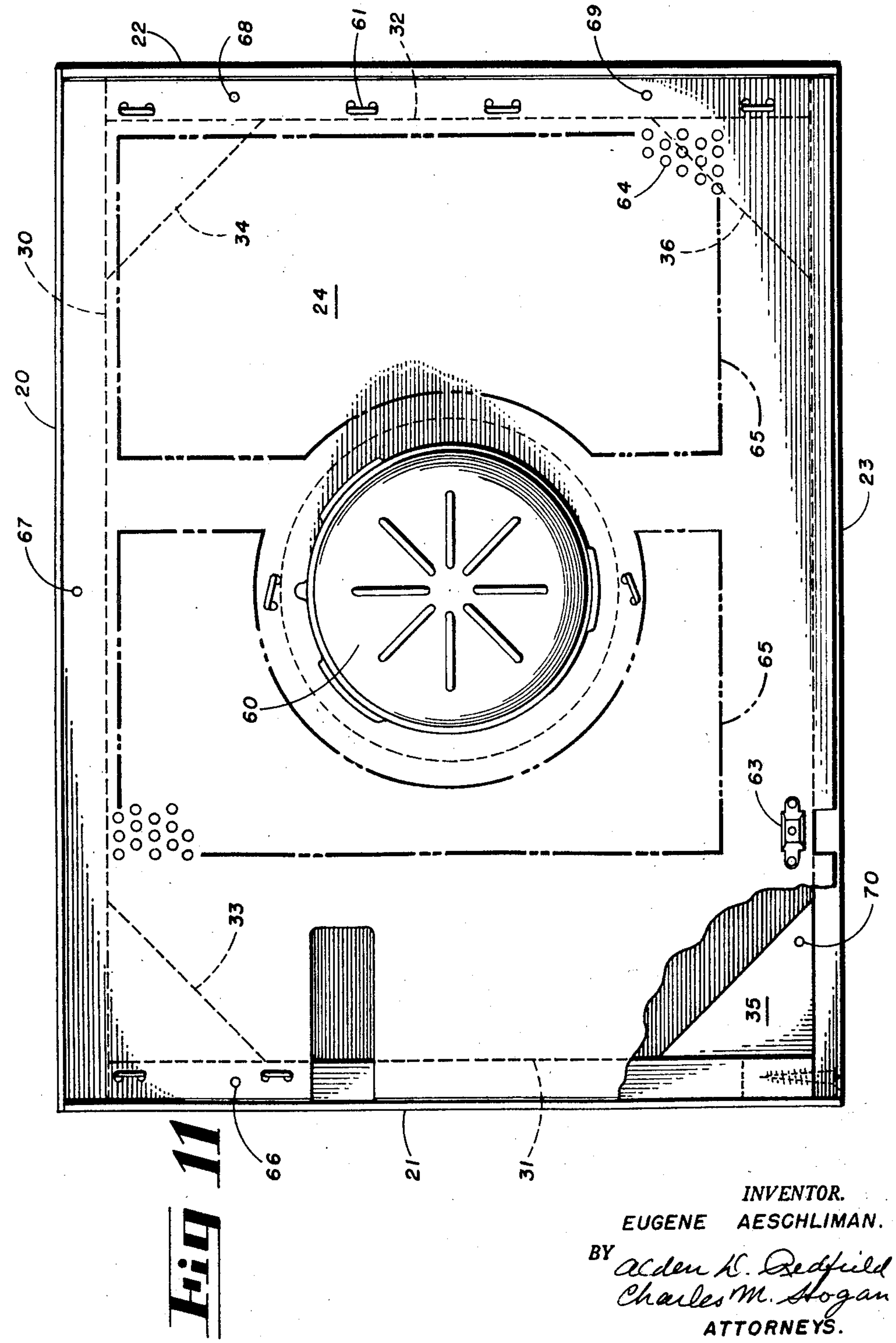
Fig. 11 is a rear view of the cabinet, the removable back panel, and the supporting base panel, showing the details of their assembly.
Figure 17:
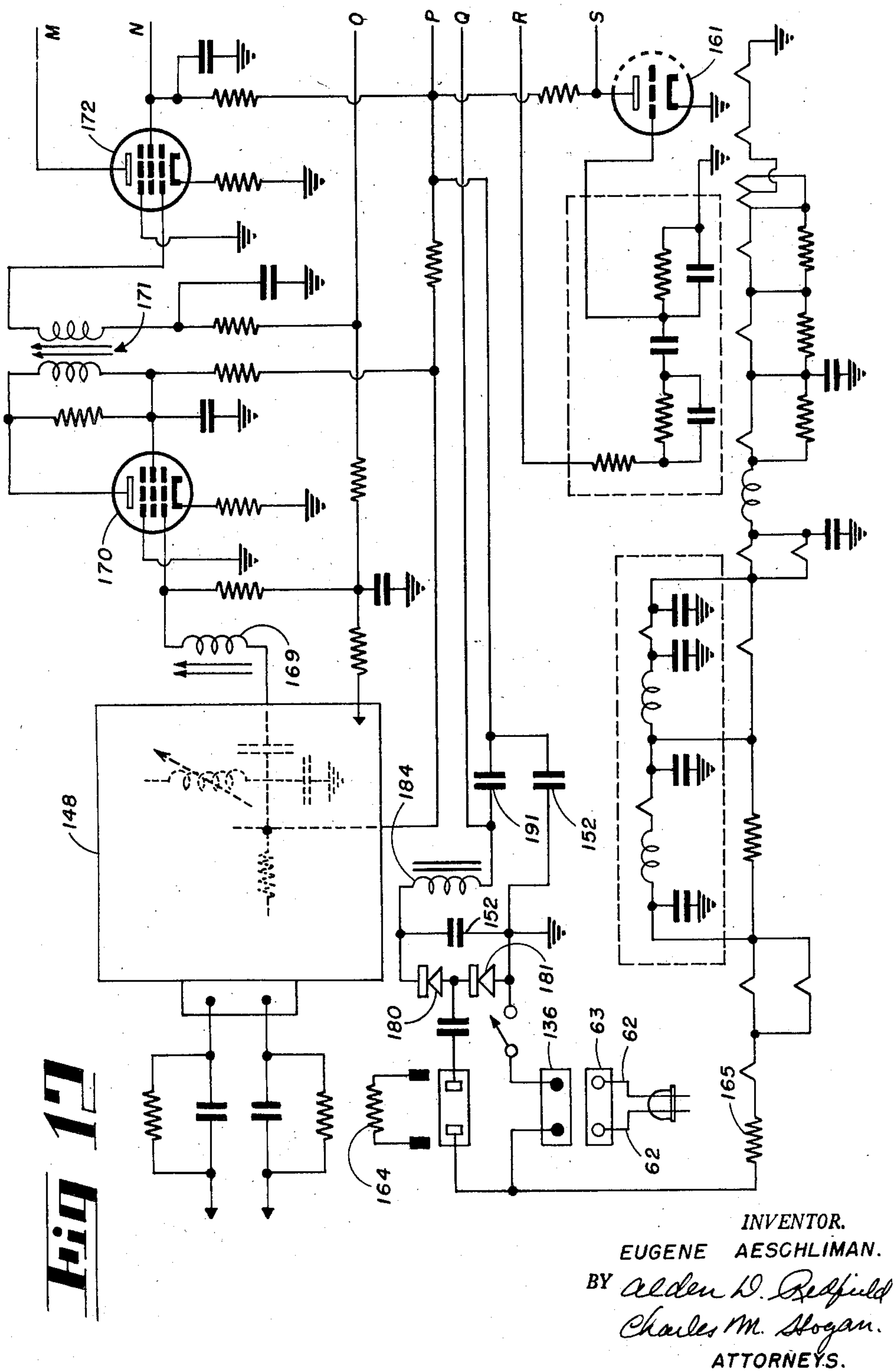

Referring now specifically to Figs. 1, 3, and 11, there is illustrated a television receiver cabinet construction comprising a top panel 20, right and left side panels 21 and 22, and suitable structural expedients for securing these three panels in assembly, together with a removable back panel 24. The assembly of panels 20, 21, and 22 is removable from base panel 23. The cabinet is so arranged that the face of the picture tube 82 occupies substantially the entire frontal area, the face being located adjacent a mask 43 disposed behind safety glass 25. The glass is secured in position by frontal molding strips 26, 27, 28, and 29.

The top and side panels of the cabinet are secured in rigid assembly by framework members and triangular reinforcing blue blocks. The top, left-side, and right-side rear framework members for the cabinet are illustrated in Fig. 3 and designated by the reference numerals 30, 32, and 31. Additional strength is imparted to the assembly by the triangular reinforcing blocks 33, 34, 35, and 36, one of which is provided at each of the four corners of the rear frame structure. It will be understood that generally similar top, right-side, and left-side framework members are provided at the front of the cabinet, the left-side member 40 being illustrated in Fig. 3. Disposed between the vertically extending framework members 32 and 40 are upper and lower side framework members, of which only the lower member 37 is illustrated in Fig. 3. The left side of the framework is further reinforced by the generally vertically extending triangular reinforcing blocks 41 and 42 and the horizontally extending triangular reinforcing blocks 38 and 39 there shown. It will be understood that the construction and framing of right-side panel 21 is similar to that of left-side panel 22, and further description thereof is considered to be unnecessary. Mask 43 and the left front framework member 40 and the corresponding right front member (not shown) are appropriately shaped so that the safety glass is secured in place in conventional fashion by a number of retaining clips such as those illustrated at 44 and 45, bearing on the margin of the mask and secured to the framework.

The picture tube face occupies substantially the entire frontal area of this cabinet, and the shafts 137, 138, 139, 140, and 141—142 (Fig. 2) of the following control units extend through openings 55, 56, 57, 58, and 59 in the right side of the cabinet (Figs. 1 and 2): the vertical hold control, which terminates in knob 46; the horizontal hold control, which terminates in knob 47; the combined on-off and volume control, which terminates in knob 48; the contrast control, which terminates in knob 49; and the tuning and vernier tuning controls which terminate in the concentric knobs 50 and 51, respectively.

The speaker louvers 52 are formed on the right-side panel 21 (Fig. 1), and there are also provided louvers 53 in the bottom panel 23, and 54 in the left-side panel 22 (Fig. 3). As best seen in Figs. 3 and 11, the margins of the side panels 21 and 22 extend slightly below the framework members such as 37, extending from front to rear of the cabinet, so that such margins will be adjacent the side edges of bottom panel 23 when such panel is in place. The removable rear panel 24 of the cabinet is provided with a well or cup into which the neck 83 of the cathode ray picture tube 82 extends. A suitable self-contained antenna 61 (Fig. 3) is secured to the back panel in any suitable conventional fashion. The back panel is perforated at 64, such perforations continuing throughout the area indicated by the dashed outline 65 (Fig. 11). Secured to the rear panel 24 is a power interlock socket member 63 which is connected to the power supply cord 62. The removable back panel is secured to the cabinet by wood screws 66, 67, 68, 69, and 70 as shown in Fig. 3. The specific description of the mode of assembly of the supporting panel 23 and the remainder of the cabinet is deferred pending a consideration of the picture tube and chassis arrangements.

*Chassis construction*

Referring now particularly to Figs. 2, 4, 5, and 6, there is shown, in a televison receiver, the combination of a horizontal supporting base 23 and a vertically oriented metallic chassis pan 71 mounted on this base. The chassis is formed with a vertical plane having an area comparable to that of the front of the picture tube, this area being bounded by a rearwardly extending peripheral flange 72. The vertical plane chassis is formed with an aperture 77. The chassis pan is rigidly secured to the base support 23 by screws 80 and 81 projecting through spacing washers 78 and 79, respectively. The cathode ray picture tube 82 is disposed with its front face parallel to the chassis pan 71 and with its neck 83 projecting through the aperture 77 in the chassis pan.

Means is provided for mounting the picture tube on the base 23. In order to secure the bulb or bell portion of the tube to the base, a strap 84, terminating in L-shaped clamping members 91 and 93, is disposed about the bulb near the face. Felt inserts 85, 86 are disposed between strip 84 and the picture tube. The picture tube reposes on tube rests or supports 87, 88, each of which is rigidly secured to base 23 by a pair of screws 101, 102 or 103, 104, respectively. The tube supports 87 and 88 are formed with horizontally outwardly and laterally extending integral clamping members 89 and 90. Threaded bolt 92 projects through clamping members 89 and 91 to form a clamp on the right side of the picture tube. Similarly, a bolt 94 projects through clamping member 93 into a threaded opening in clamping member 90 to form a clamp on the left side of the picture tube. The two clamps are adjusted to maintain strap 84 in tension and the flared portion of the picture tube rigidly in place. Felt inserts 95 and 96 are again severally provided between the clamp members and the picture tube surface.

In order to provide additional security for the picture tube, the tube supports 87, 88 are, respectively, formed with laterally outwardly extending vertical tabs 105 and 106 formed with threaded openings through which pass, respectively, the threaded ends 108 and 111 of tie-rods 107 and 110. The tie rods 107 and 110 are adjustably tensioned by bolts 109 and 112 engaging such threaded ends. The tie-rods extend upwardly and rearwardly in general conformity to the convergence of the bulbous or bell portion of the tube, and they are turned back as shown at 113 (Fig. 5) for anchoring in an opening 124 in a vertically extending tube-supporting bracket 115, the latter being provided with an aperture 117 through which the cathode ray picture tube extends in tight concentric relation.

The vertical bracket 115 has a peripheral forwardly extending flange 116 and is rigidly secured to the base 23 by screws 118 and 119.

Figures 9, 10:
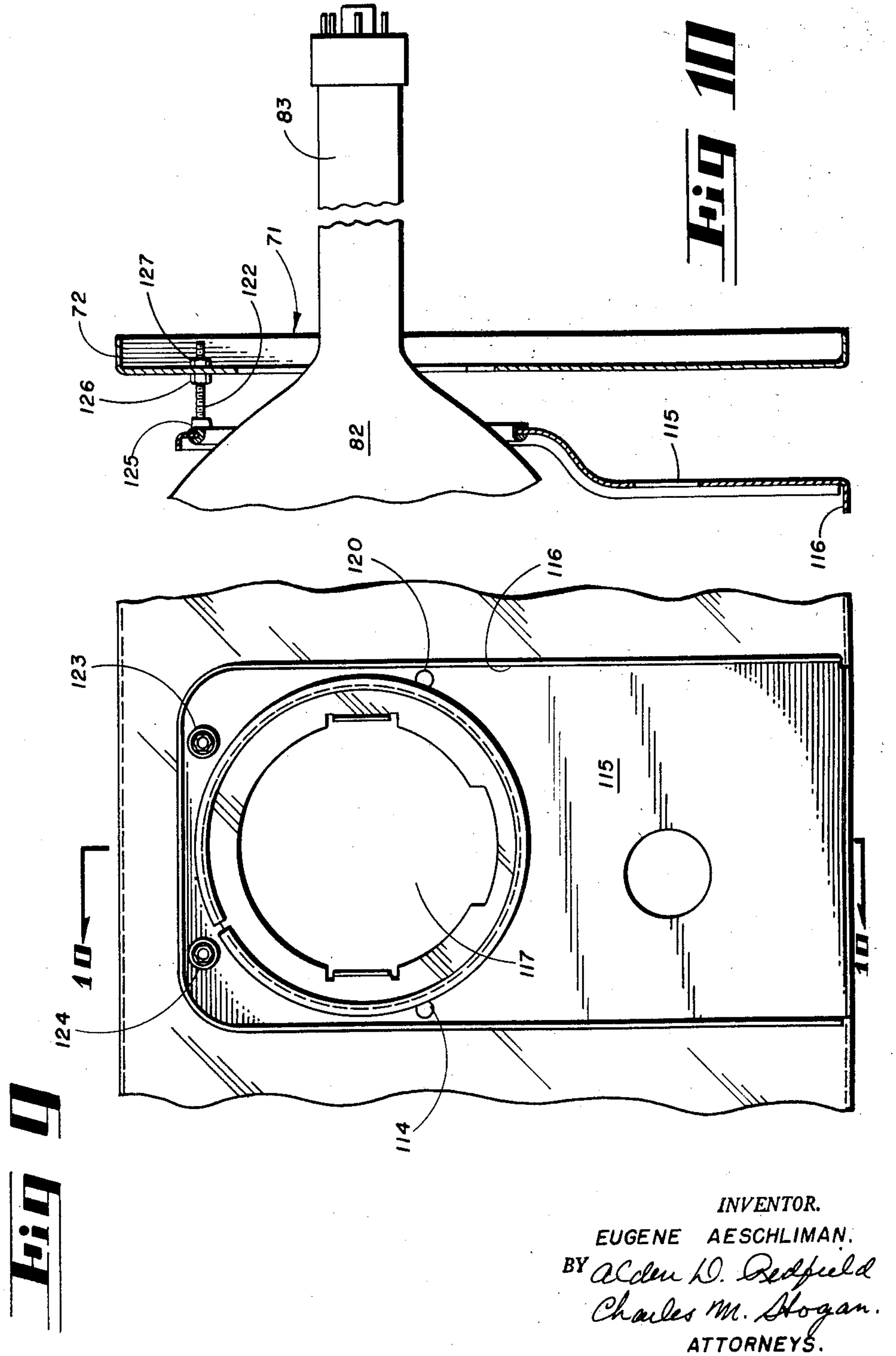
Fig. 9 is a front view of the upright cathode ray tube supporting bracket and the chassis surface in its vicinity.
Fig. 10 is a sectional view of such upright supporting bracket and the chassis pan, as taken along the section line 10—10 of Fig. 9, looking in the direction of the arrows, the cathode ray picture tube being also shown in side elevation in this view.

The tube-supporting bracket 115 is fastened to the vertical chassis pan 71 by bolts 121, 122 (Fig. 6) which pass through apertures 123 and 124, respectively (Fig. 9). Bolt 122 is secured to bracket 115 by nut 125 (Fig. 10) and to the chassis 71 by nuts 126 and 127, and bolt 121 is similarly arranged. A metallic grounding member 128 extends from the flange 72 of the chassis pan to the conventional aquadag coating on the picture tube.

A yoke assembly 73, provided with a magnetic centering expedient including centering levers 74, 75 reposes about the neck of picture tube 83 rearwardly of chassis 71. The yoke assembly is supported above the arcuate ledge 99, which is adjustably secured by a nut and bolt arrangement to integral rearwardly extending ears 98 and 97 formed in chassis 71, the openings in curved member 99 being horizontally slotted and those in the tabs 98 and 97 being vertically slotted (Figs. 2 and 4) to provide for vertical and horizontal adjustment of the position of the member 99. A wing nut 100 adjustably supports the yoke assembly.

*A representative arrangement of components*

In one commercially successful receiver embodying the present invention and manufactured in very large quantities, the general arrangement of components about to be described was employed. This list is not intended to enumerate all of the components, and it is confined to those of substantial size. Further, this representative arrangement of components is intended to be illustrative and not exhaustive.

Figure 7:
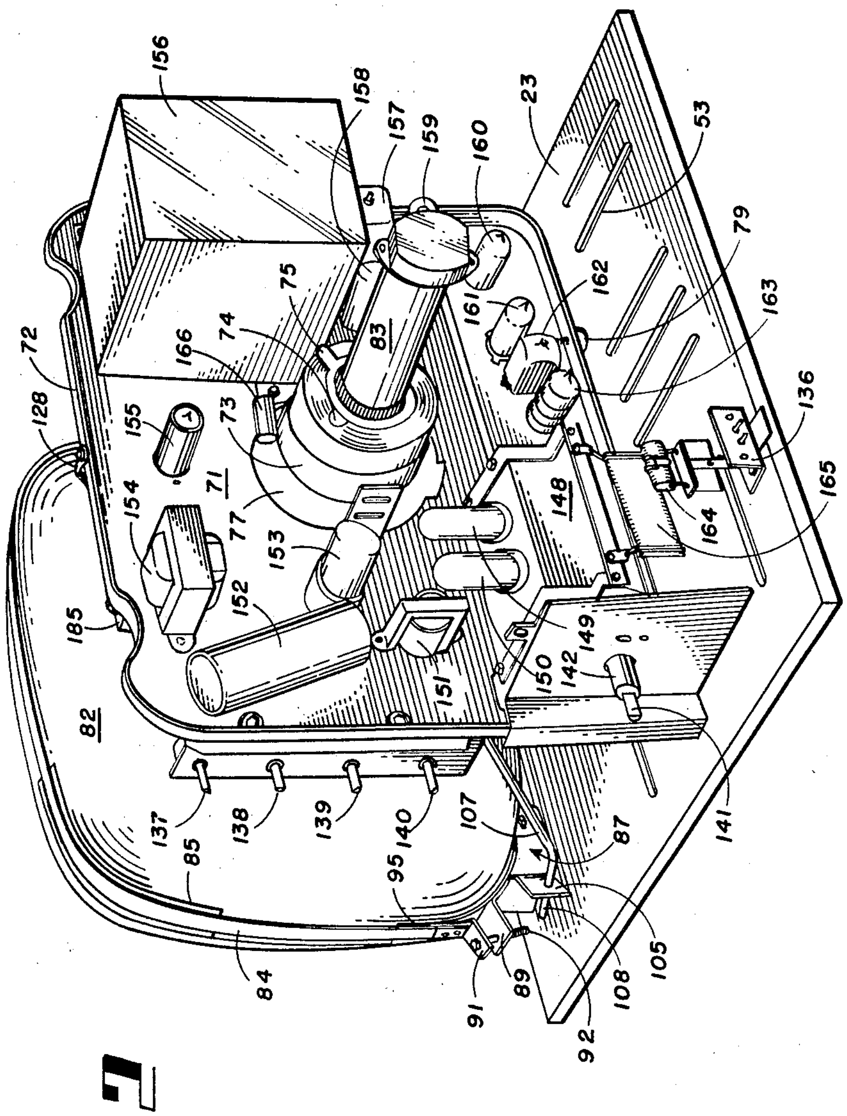
Figs. 7 and 8 are views taken on section lines 7—7 and 8—8 of Figs. 4 and 5, showing, respectively, the back and front of the chassis, with major components in place but with the cathode ray picture tube removed.

Referring to the rear of the chassis, generally to Figs. 2, 4, 5, 6, and 7, particularly to Figs. 2 and 7, and proceeding generally in a clockwise direction from the lower lefthand quadrant of the chassis (Fig. 7), there can be seen in position the following components.

The tuner 148 with its upwardly extending r.f. (radio frequency) tube 150 and mixer-oscillator tube 149 and its laterally extending control shaft 141 and concentric vernier adjustment 142;

The audio output transformer 151;

A group of four electrolytic filter capacitors 152;

The rearwardly extending audio output tube 153;

The vertical output transformer 154;

The rearwardly extending vertical oscillator and vertical output tube 155;

The rearwardly extending box-like metallic shield 156, containing the horizontal output, damper, and high voltage rectifier tubes, together with the horizontal deflection transformer, such shield 156 being disposed in the upper right-hand quadrant of the rear portion of the vertically oriented chassis pan 71;

Yoke coupling capacitor 166, located immediately above and slightly to the right of the center of yoke 73;

A shielding can 157 containing the horizontal oscillator transformer and trap circuit inductance;

The rearwardly extending horizontal automatic frequency control and oscillator tube 158;

The rearwardly extending combined limiter, detector, and audio amplifier tube 159;

The synchronizing signal amplifier and sound I.F. (intermediate frequency) amplifier tube 160;

The sync clipper and video amplifying tube 161;

A shielding can 162 containing the transformer between the third I.F. stage and the video detector;

The quadrature coil 177 for the gated beam tube type of audio limiter, discriminator, and amplifier;

The interstage transformer 176 between the sound I.F. amplifier and the combined limiter, detector, and audio amplifier;

The sound trap transformer 175 at the output of the video detector;

The horizontal lock adjustment 174;

The buzz control resistor 178;

The capacitor 179 which couples the video amplifier to the cathode of the picture tube;

The rearwardly extending third picture I.F. and video detector tube 163;

The interstage transformer 173 between the second and third picture I.F. stages;

The rearwardly extending second picture I.F. tube 172;

The interstage transformer 171 between the first and second picture I.F. stages;

The first picture I.F. tube 170;

The picture intermediate frequency input coil 169.

The height control adjustment 207, linearity control 208, and brightness control 209 are also located on the back of the chassis 71, as shown in Fig. 7. These controls also project rearwardly for ready access when the rear panel of the cabinet is removed. Suspended from the rear of the tuner 148 is a negative-coefficient resistance 165 which is connected in series with the filaments of all tubes. Connected in circuit with the power interlock plug 136 is a resistor 164. A conventional speaker (not shown) is connected to the output terminals of the audio output transformer 151 and is secured immediately inside of louvers 52 when the chassis is placed in the cabinet.

Figure 6:
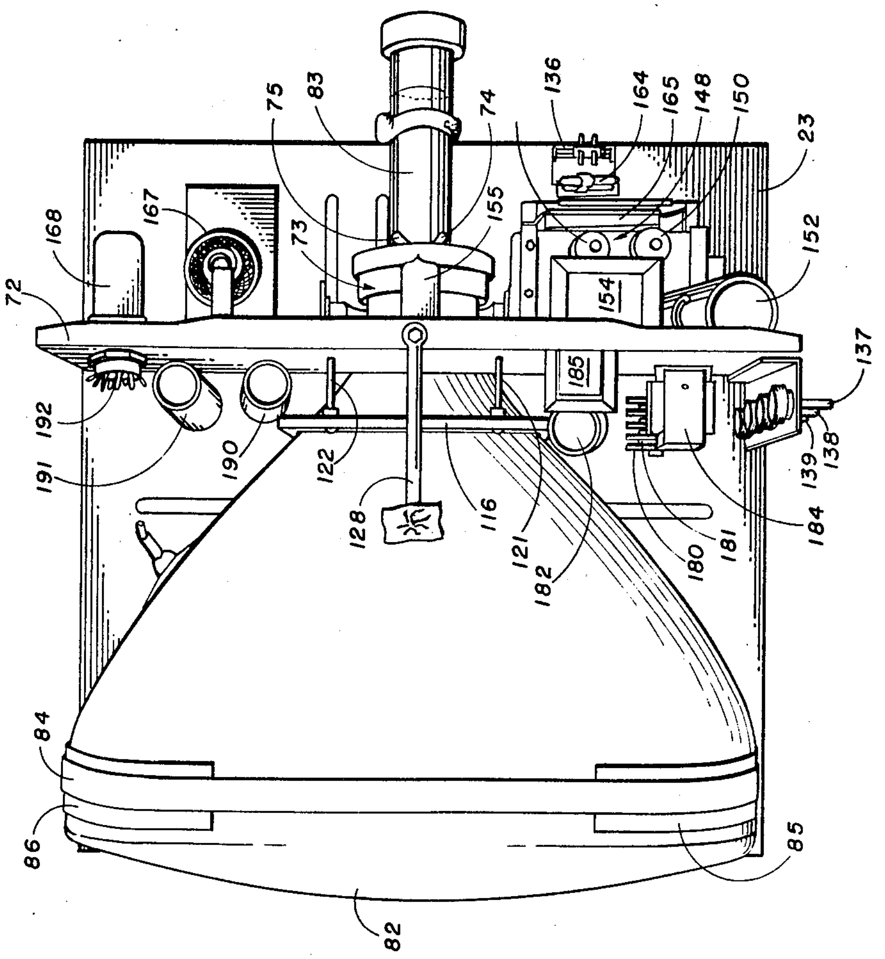
Figure 7:
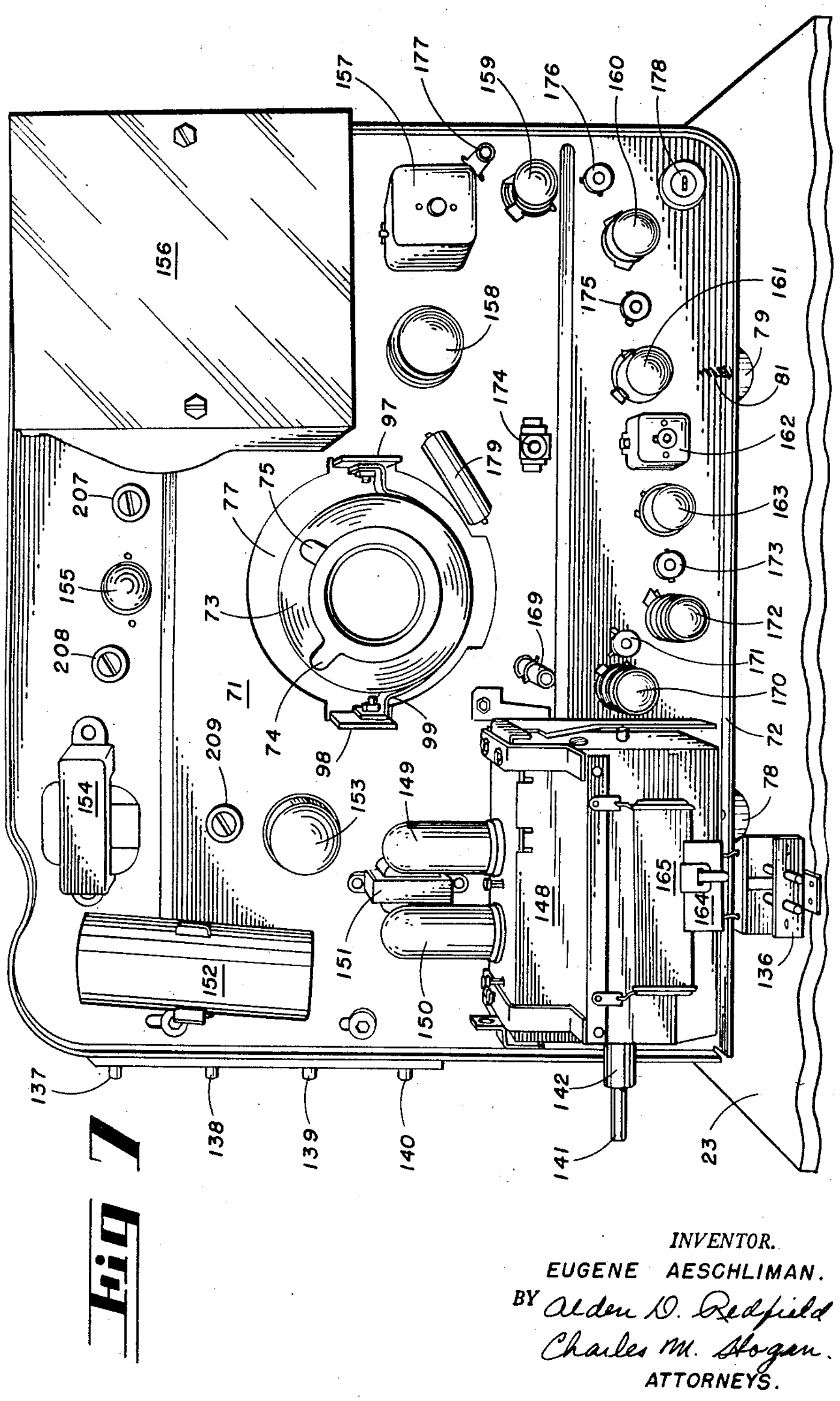
Figure 8:
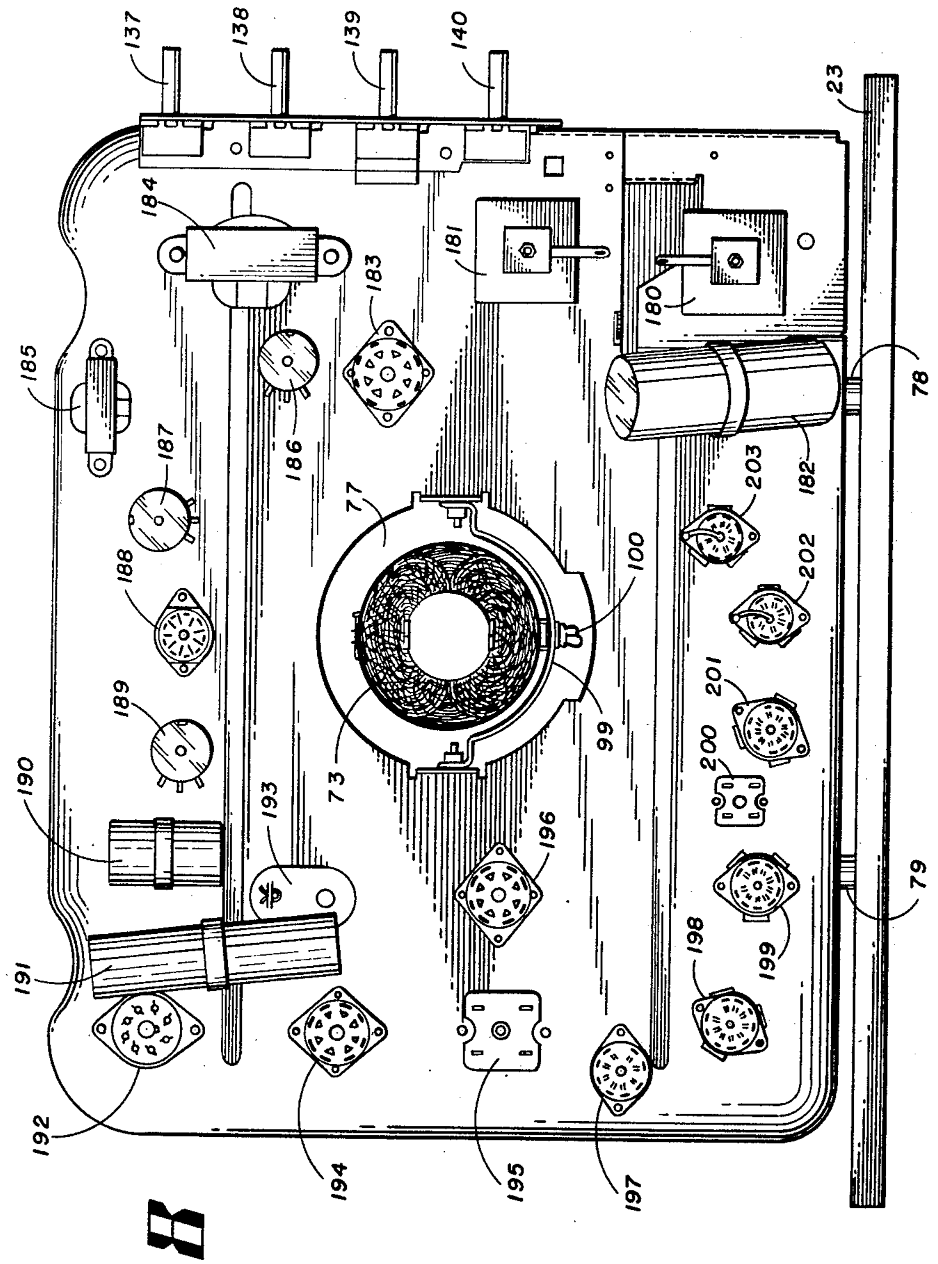

Referring to the front of the chassis and particularly to Figs. 6 and 8, and proceeding generally in a counterclockwise direction (Fig. 8), the following major components are mounted on the chassis:

The input capacitor 182 to the rectifier system;

The selenium rectifiers 180 and 181;

The audio output tube socket 183;

The filter choke 184;

The brightness control 186;

The vertical blocking oscillator transformer 185;

The vertical linearity control 187;

The socket 188 for the vertical oscillator and vertical output tube;

The height control 189;

The B boost filter capacitor 190;

Two electrolytic capacitors 191 for the low voltage power supply;

A socket 192 for the damper tube;

A socket 193 for the high voltage rectifier tube;

A socket 194 for the horizontal output tube;

The base portion 195 of the horizontal oscillator transformer and trap circuit inductance;

A socket 196 for the horizontal AFC control and oscillator tube;

The socket 197 for the combined limiter, detector, and audio amplifier tube;

The socket 198 for the sound I.F. and sync amplifier tube;

The socket 199 for the video amplifier and sync clipper tube;

The base 200 of the transformer between the last picture I.F. stage and the video detector;

The socket 201 for the third picture I.F. and video detector tube;

The socket 202 for the second picture I.F. tube;

The socket 203 for the first picture I.F. tube.

*A suitable television receiver circuit*

Figure 13:
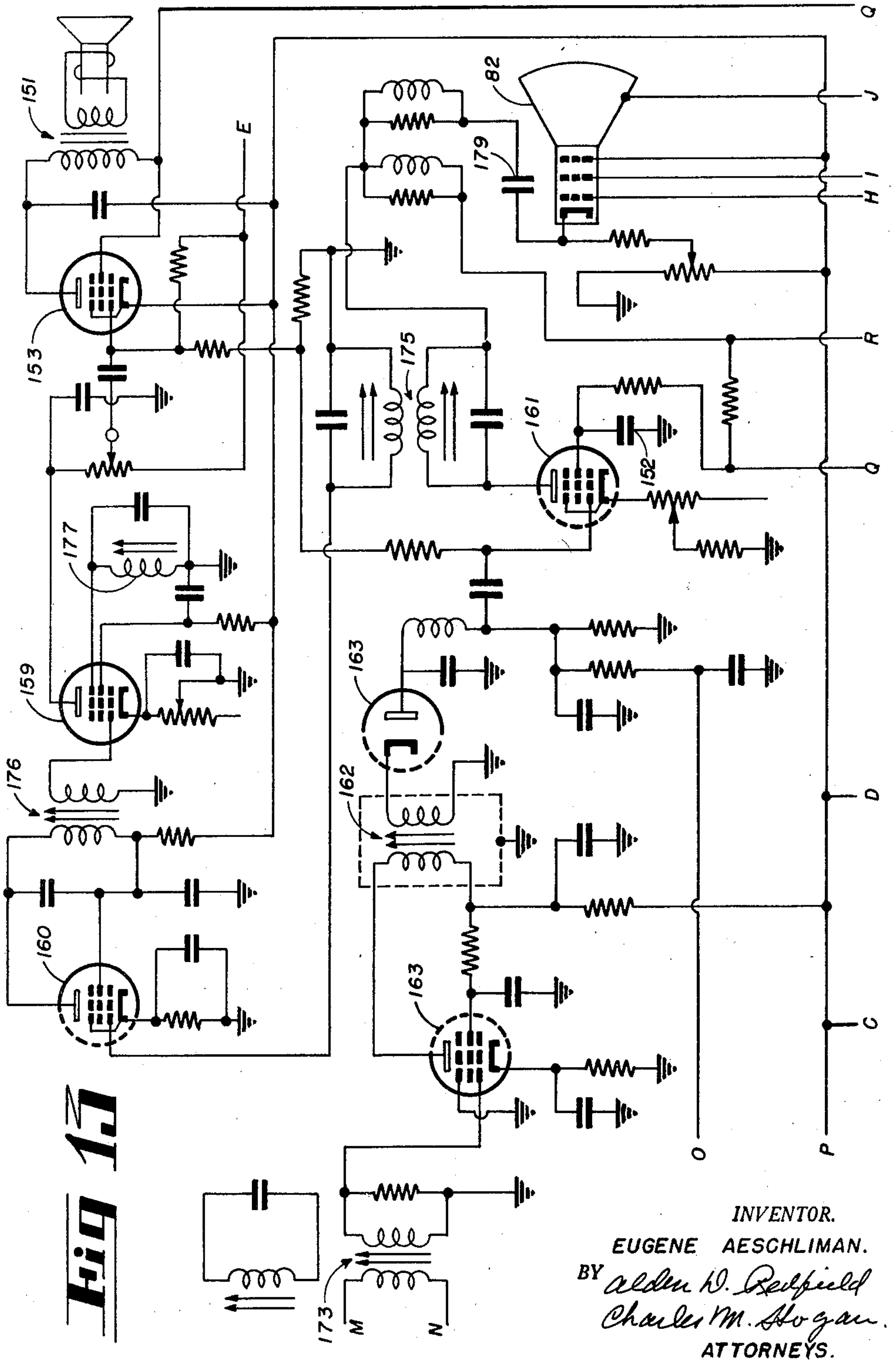
Figure 14:
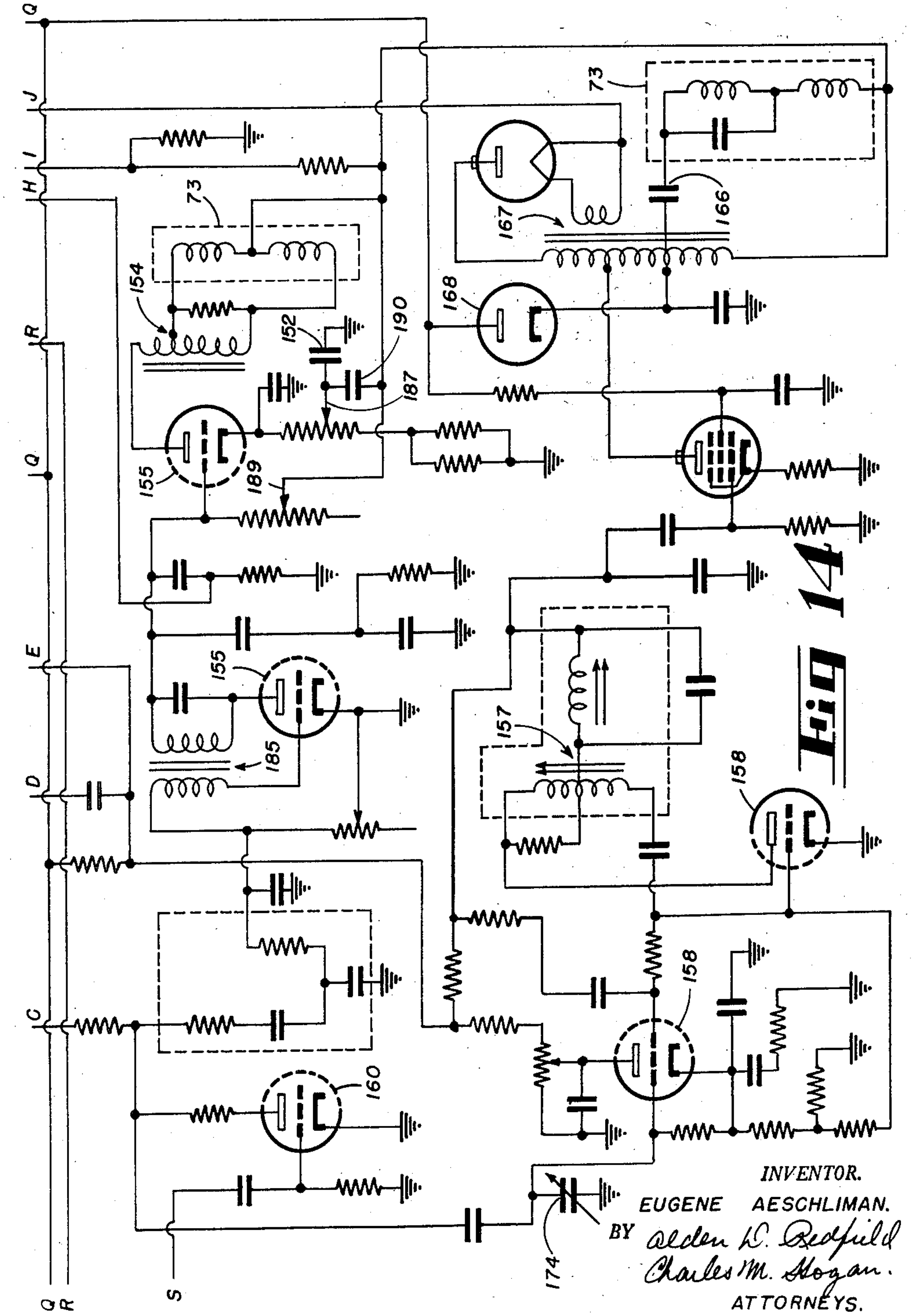

Referring now generally to Figs. 12, 13, and 14 of the drawings, there is shown a schematic diagram of a typical intercarrier sound circuit for incorporation in a television receiver in accordance with the invention. This receiver comprises a tuner 148 which may be of any conventional character, preferably the turret type Standard Coil tuner as generally described in "Television Servicing—Theory and Practice," Buchsbaum, Fig. 11.2 and pp. 136–137, Prentice-Hall, Inc., New York, 1954; and in "Television Simplified," Kiver, pp. 87–90, D. Van Nostrand Co., New York, 1954. The television receiver circuitry here involved is described in detail in Crosley Service Information Bulletin No. 477, published in March 1954 by the Service Department of the Crosley Division of Avco Manufacturing Corporation, and reference is made to that publication for a detailed description of such circuitry.

The video channel comprises a first picture I.F. tube 170, interstage coupling transformer 171, second picture I.F. tube 172, interstage transformer 173, and third picture I.F. and video detector tube 163, the latter comprising two sections intercoupled by transformer 162. The video channel progresses through the video amplifier section of tube 161 on through coupling capacitor 179 to the cathode of picture tube 82.

A sound take-off trap circuit including transformer 175 is provided at the output of the video amplifier. The 4.5 megacycle sound carrier is applied to the sound I.F. amplifier section of tube 160. The sound channel is traced from the sound section of tube 160 through transformer 176, the combined limiter, detector and audio frequency amplifier tube 159, the audio output tube 153, and the audio output transformer 151 to a conventional speaker. The composite synchronizing and video signals are taken from the output of the video amplifier and applied to the input of the sync clipping section of tube 161. Synchronizing signal separation occurs in that section and in the sync amplifying section of tube 160. Tube 160 is coupled through a multiple-time-constant circuit to the vertical oscillator section of tube 155, which is in turn coupled to the vertical output section of tube 155. The output of that section is coupled through transformer 154 to the vertical deflecting coils contained in the yoke 73.

An output of the sync amplifying section of tube 160 is coupled in conventional fashion to the horizontal AFC control section of tube 158. That tube develops a unidirectional control potential which is applied to the horizontal oscillator section of tube 158 in order to maintain synchronism. The horizontal deflection system includes the usual horizontal output power amplifying tube, a damper tube 168, a high voltage rectifier tube, and an appropriate deflection transformer 167, the deflection output circuit of such transformer being coupled to the horizontal deflecting coils included in the yoke 73. The high voltage power supply comprises a flyback system. The low voltage power supply features a voltage doubler circuit comprising selenium rectifiers 180 and 181, filter choke 184, and capacitor sections included in the units numbered 152 and 191. The filaments of the various tubes are arranged in a series string as shown.

*Assembly of chassis and cabinet*

Referring now specifically to Fig. 3, the cathode ray tube is not there shown, but it will be understood that when the picture tube is in position its neck extends into cup 60 and the lip of the tube on the enlarged end reposes on the horizontally directed tabs 204 and 205 of the tube rests 87 and 88. The picture tube 82 and the vertical plane chassis 71, together with supporting panel 23, constitute a unitary assembly which is removable as a whole from the cabinet. The cabinet provided in accordance with the invention is essentially of a bonnet type comprising the panels 20, 21, and 22, the safety glass 25, and the associated framework and reinforcing members, such elements all being collectively removable as an entity from the assembly comprising base panel 23, chassis 71, and picture tube 82. The bonnet type cabinet is secured in place on supporting base 23 by a plurality of screws 129, 130, 131, 132, 133, 134, and 135, as best shown in Fig. 3.

The television receiver cabinet construction herein shown offers a number of significant advantages. First, the construction occupies approximately 33% less space than conventional prior art 17-inch picture tube sets, the cabinet being only slightly larger in it greatest dimensions than the picture tube alone. Second, this cabinet construction is very light. The vertical plane chassis requires a relatively small cabinet and is itself relatively light in weight. Accordingly, this construction is particularly adapted for incoporation in portable television receivers. Third, the receiver herein shown is extraordinarily convenient for the service man, in that removal of tubes other than the picture tube and manipulation of service adjustments can readily be accomplished without removing the chassis from the cabinet, by simple removing the rear panel. Ready access to all of the components, including those in the front of the chassis, is obtained by simple removing the bonnet type cabinet from the supporting base 23.

Subject matter disclosed but not claimed herein is claimed in the several copending patent applications of William H. Myers and Carl L. Ackerman, entitled "Television Receiver Construction" and "Television Receiver Chassis Construction," respectively, filed contemporaneously herewith, Serial Nos. 430,875 and 430,877, respectively, and assigned to the Avco Manufacturing Corporation, the assignee of the present application and invention and the manufacturer, through its Crosley Division, of the well-known Crosley "Super V" television receiver, which incorporates the present invention and those of such copending applications.

While there has been shown and described what is at present considered to be the preferred embodiment of the present invention, as incorporated in the commercially successful Crosley "Super V" television receiver, it will be understood that various modifications and changes may be made therein without departing from the true scope of the invention as defined by the appended claims.

I claim:

1. A television receiver comprising, in combination: a horizontal supporting base, and a self-supporting wall structure vertically extending from said supporting base and removably secured thereto, said base and said wall structure forming a rigid enclosure; an upright component-supporting chassis secured to said base, said chassis having an aperture therethrough; a cathode-ray tube having a rear portion terminating in a neck and a bulb-shaped portion terminating in a screen, said cathode-ray tube being positioned with its neck extended through said aperture; means secured to said supporting base and embracing said bulb-shaped portion for vertically clamping down said cathode-ray tube in fixed relation to said supporting base; means spaced from the last-named means for supporting the rear portion of the cathode ray tube in fixed relation to said supporting base; whereby said supporting base, chassis, cathode ray tube and tube-supporting means form a unitary ensemble substantially confined within said rigid enclosure.

2. The invention as defined in claim 1 wherein said wall structure is provided with an open portion for providing access to certain of said components, and closure means for said open portion, whereby minor access is accomplished through said open portion and major access is accomplished by removing said wall structure from said base.

3. The invention as defined in claim 2 wherein said wall structure is provided with a transparent portion adjacent said screen.

4. A television receiver comprising, in combination: a rigid cabinet enclosure including a horizontal exterior supporting base panel and a self-supporting wall structure vertically extending from said exterior supporting base panel and removably secured thereto, a component-supporting chassis formed with an aperture therethrough and secured in up right relation to said exterior supporting base panel; a cathode ray tube having a rear portion terminating in a neck extended through said aperture and a bulb-shaped portion terminating in a frontal screen, said chassis being positioned substantially entirely behind said frontal screen and substantially entirely within the rearward projection of said frontal screen; and tube-supporting means secured to said exterior supporting base panel and embracing said bulb-shaped portion for vertically clamping down said cathode ray tube in fixed relation to said exterior supporting base panel, whereby said exterior supporting base panel, chassis, cathode ray tube and tube-supporting means form a unitary ensemble, said chassis, said cathode ray tube and said tube-supporting means being substantially confined within said rigid cabinet enclosure.

References Cited in the file of this patent

UNITED STATES PATENTS

| | | |
|---|---|---|
| 2,100,226 | Stenberg | Nov. 23, 1937 |
| 2,176,212 | Dijksterhuis | Oct. 17, 1939 |
| 2,440,260 | Gall | Apr. 27, 1948 |
| 2,543,146 | Bace | Feb. 27, 1951 |
| 2,690,944 | Herron | Oct. 5, 1954 |

FOREIGN PATENTS

| | | |
|---|---|---|
| 1,000,706 | France | Oct. 17, 1951 |
| 379,863 | Germany | Feb. 5, 1953 |